United States Patent
Finlow-Bates

(10) Patent No.: US 11,025,714 B2
(45) Date of Patent: *Jun. 1, 2021

(54) SYSTEM AND METHOD FOR ANNOUNCING CRYPTOGRAPHIC KEYS ON A BLOCKCHAIN

(71) Applicant: Keir Finlow-Bates, Kangasala (FI)

(72) Inventor: Keir Finlow-Bates, Kangasala (FI)

( * ) Notice: Subject to any disclaimer, the term of this patent is extended or adjusted under 35 U.S.C. 154(b) by 27 days.

This patent is subject to a terminal disclaimer.

(21) Appl. No.: 16/458,447

(22) Filed: Jul. 1, 2019

(65) Prior Publication Data

US 2019/0349195 A1 Nov. 14, 2019

Related U.S. Application Data

(63) Continuation of application No. 16/180,029, filed on Nov. 5, 2018, now Pat. No. 10,341,431, which is a continuation of application No. 15/270,984, filed on Sep. 20, 2016, now Pat. No. 10,135,921.

(51) Int. Cl.
| | |
|---|---|
| *H04L 29/06* | (2006.01) |
| *H04L 9/14* | (2006.01) |
| *G06F 16/23* | (2019.01) |
| *H04L 29/08* | (2006.01) |
| *H04W 12/106* | (2021.01) |
| *H04W 12/0431* | (2021.01) |

(52) U.S. Cl.
CPC ...... *H04L 67/1078* (2013.01); *G06F 16/2308* (2019.01); *H04L 9/14* (2013.01); *H04L 63/0435* (2013.01); *H04L 63/0442* (2013.01); *H04L 63/06* (2013.01); *H04L 63/061* (2013.01); *H04L 67/104* (2013.01); *H04W 12/0431* (2021.01); *H04W 12/106* (2021.01); *H04L 63/126* (2013.01)

(58) Field of Classification Search
CPC ............. H04L 67/1078; H04L 63/0442; H04L 67/104; H04L 63/061; H04L 63/06; H04L 63/0435; H04L 63/126; H04L 9/14; H04W 12/04; H04W 12/10; H04W 12/1006; H04W 12/04031; G06F 16/2308
See application file for complete search history.

(56) References Cited

U.S. PATENT DOCUMENTS

| | | | |
|---|---|---|---|
| 9,894,485 B2 * | 2/2018 | Finlow-Bates | ....... H04W 4/025 |
| 10,135,616 B2 * | 11/2018 | Finlow-Bates | .... G06Q 20/3829 |
| 10,135,921 B2 * | 11/2018 | Finlow-Bates | ........................... H04W 12/04031 |

(Continued)

*Primary Examiner* — Mohammad A Siddiqi

(57) ABSTRACT

A method and apparatus is presented for announcing the existence of cryptographic key pairs within a distributed ledger system in which no central trusted authority is available, consisting of sending a key announcement message by a network connected device to other network connected devices over a peer-to-peer network for inclusion in the distributed ledger. Once a valid key announcement message for a public key is included in the ledger, any future transactions that reference an address associated with the public key or other messages concerning said public key are accepted by other network connected devices on the peer-to-peer network and are included in the distributed ledger. If transactions or other messages reference an address not associated with an announced public key, they may be rejected by the peer-to-peer network and may not be included in the distributed ledger.

8 Claims, 6 Drawing Sheets

(56) References Cited

U.S. PATENT DOCUMENTS

| | | | |
|---|---|---|---|
| 10,341,431 B2 * | 7/2019 | Finlow-Bates | H04L 67/1078 |
| 2005/0286488 A1 * | 12/2005 | Briscoe | H04M 15/83 |
| | | | 370/351 |
| 2010/0180123 A1 * | 7/2010 | Kopetz | G06F 21/64 |
| | | | 713/176 |
| 2016/0086175 A1 * | 3/2016 | Finlow-Bates | G06Q 20/401 |
| | | | 705/77 |
| 2016/0350749 A1 * | 12/2016 | Wilkins | G06Q 20/382 |

* cited by examiner

SYSTEM AND METHOD FOR ANNOUNCING CRYPTOGRAPHIC KEYS ON A BLOCKCHAIN

CROSS REFERENCE TO RELATED APPLICATIONS

The present application is a continuation of, and claims priority of, allowed U.S. patent application Ser. No. 16/180,029, entitled "System And Method For Announcing Cryptographic Keys On A Blockchain", filed on Nov. 5, 2018, which is a continuation of U.S. patent application Ser. No. 15/270,984, entitled "System And Method For Announcing Cryptographic Keys On A Blockchain", filed on Sep. 20, 2016, which issued as U.S. Pat. No. 10,135,921 on Nov. 20, 2018. The aforementioned United States applications and patent are hereby incorporated by reference in their entirety.

TECHNICAL FIELD

The invention relates to computer systems and methods concerned with cryptographic keys, and more specifically to the announcement of keys used in signing data submitted for inclusion in a shared file or ledger, which is distributed, extended and maintained over a peer-to-peer network.

BACKGROUND OF THE INVENTION

Distributed ledgers provided in peer-to-peer systems, such as the blockchain used in the Bitcoin cryptocurrency system, rely on public/private cryptographic key pairs for the signing of transactions that transfer credits of commercial value between entities. In such systems, participants generate their own public/private key pairs, and use the private key of the pair to sign transfers of the credits of commercial value from an address associated with the public key of the pair to an address associated with a public key of a different pair.

There are many proposed uses for distributed ledgers, such as vote tallying US20160027229, health care transactions US20150332283, and allowing access to property for rent US20160086175. These and many other applications rely on the same use of public/private key pairs.

A problem with such distributed ledger systems is that a valid address associated with a public key can be generated without knowing a private key that is used to construct the public key. If no entity knows the private key, then any credits transferred to the address associated with the public key are irredeemable.

Another problem in systems such as Bitcoin is that the public key associated with the private key 0 is a valid key for transferring credits to, but the credits can never be redeemed. Due to the structure of the asymmetric key system used (the Elliptic Curve Digital Signature Algorithm, or ECDSA), credit transfer messages cannot be signed with a private key 0. As a result, this public key currently holds a significant level of irredeemable credits. Computer programming errors can result in the accidental generation of a private key 0 rather than a valid private key, and subsequent accidental crediting of the public key, resulting in a permanent loss of the credits.

A further problem is that a consortium of entities using a shared ledger or blockchain may wish to bar a specific entity from participating in the use of the shared ledger.

All the aforementioned problems could be overcome in part by the use of key revocation methods and systems, as detailed in US20150149089, in order to prevent the addition to the distributed ledger of any transactions referring to the address associated with a revoked public key. This, however, does not resolve the problem where, for example, a new public key is created in error and used to generate an address, which is subsequently credited with irredeemable credits before the new public key can be revoked.

It is the intention of the present invention to address the shortcomings of the prior art, that is, the problem of preventing the transfer of credits of commercial value or the transmission of messages to an address associated with a public key for which a private key is unknown to any entity.

SUMMARY OF THE INVENTION

In accordance with the present invention, a solution is provided for announcing of the existence of newly issued cryptographic keys used in a peer-to-peer distributed ledger. The problem is an absence of a trusted central authority for issuing authorized keys, and the potential for the loss of, amongst other things: data privacy, control of virtual or on-line identities, and data of financial value, if private keys used on the system are unknown or cannot be retrieved.

Embodiments of the invention are based on the use of the peer-to-peer distributed ledger as a medium for issuing authorized keys to participants in the peer-to-peer system.

In one embodiment of the invention a first of a plurality of network connected devices may generate a key announcement message for a public/private key pair.

The first of the plurality of network connected devices may transmit the key announcement message to a remainder of the plurality of network connected devices through the medium of a peer-to-peer network.

The remainder of the plurality of network connected devices may then verify that the message is well-formed according to, in for example one embodiment of the invention, a peer-to-peer network agreed standard for key announcement messages. If the key announcement message is deemed valid, the other network connected devices may append the key announcement message to their copy of the shared ledger. In this manner, the key announcement message is stored in the shared ledger for future retrieval and examination.

In another embodiment of the invention, the first of the plurality of network connected devices may submit a list comprising a plurality of public keys of a plurality of public/private key pairs in the key announcement message.

Subsequently, on accepting the key announcement message on to the shared ledger, any request to append further messages to the shared ledger signed by any of a plurality of private keys of the plurality of public/private key pairs announced in the key announcement message, or to transfer credits of commercial value to be associated with the public key of the any of the public/private key pairs announced in the key announcement message, may be accepted by the plurality of network connected devices, in accordance with this embodiment of the invention.

In some embodiments of the invention the key announcement message may be signed by the first network connected device using a private key of a one of the plurality of public/private key pairs being announced, or an associated public/private key pair, for example by using the ECDSA signature scheme, the ElGamal signature scheme, the DSA signature scheme, or some other asymmetric key infrastructure.

In other embodiments of the invention the key announcement message may be signed by the first network connected device using a private key of a one of a plurality public/ private key pairs announced in a previous key announcement message accepted in to the shared ledger at an earlier time.

In further embodiments of the invention the key announcement message may be signed by the first network connected device using a private key of a public/private key pair announced in a first block of the shared ledger.

In another embodiment of the invention, on receiving a key announcement message, any number of a plurality of network connected devices connected to the peer-to-peer network may attempt to perform a validation computation on the key announcement message, and on succeeding in performing the validation computation, may then transmit the key announcement message and a result of the validation computation to a remainder of the plurality of network connected devices connected to the peer-to-peer network for inclusion in the shared ledger.

The remainder of the plurality of network connected devices may then append to their copy of the shared ledger, the key announcement message and a one of the successful validation computations. Usually this will be a first successful validation computation received, and more details are provided below.

When the key announcement message is submitted to the peer-to-peer network, a subset of the plurality of network connected devices associated with the peer-to-peer network may forward copies of the key announcement message to a remainder of the plurality of network connected devices, as is known to those familiar in the art of peer-to-peer network communication. Network connected devices on the peer-to-peer network may be standard nodes, in that they simply forward messages on to other devices on the peer-to-peer network, or they may be enhanced nodes, which are nodes that also perform validation computations on submitted key announcement messages in order to solve a proof-of-work, proof-of-stake or other computationally difficult problem that confirms to other standard nodes and enhanced nodes that the submitted message should be added to the shared ledger.

A first of the enhanced nodes to generate a successful result of the validation computation may submit this, together with the key announcement message, to the peer-to-peer network. The remainder of the standard nodes and enhanced nodes may then check the validation computation before adding the key announcement message and the result of the validation computation to the shared ledger, if the validation computation is shown to be correct.

In order to provide an incentive for third parties to join the peer-to-peer network as standard nodes or enhanced nodes, and process or review key announcement messages, a commercially-valued credit system may be associated with the described system. When the validation computation result and the key announcement message are submitted to the peer-to-peer network by the first of the enhanced nodes, it may also submit a notification that a number of commercially-valued credits are to be credited to a public key of a public/private key pair as specified by the enhanced node performing the validation computation. When the remainder of the plurality of network connected devices add the key announcement message and the result of the validation computation to the shared ledger, they also add this notification to the shared ledger.

In another embodiment, the key announcement message submitted by the network connected device may contain an offer of commercially-valued credits that are allocated to a public key of a public/private key pair associated with the network connected device. The commercially-valued credits may then be claimed by a first of a plurality of network connected devices that produces a validation computation accepted into the public ledger, for example by including a transaction notification that reallocates the commercially-valued credits to a public key associated with the first of the plurality of network connected devices.

In the preceding preferred embodiment of the invention the commercially-valued credits are associated with the public key of a public/private key pair, however in other embodiments of the invention the commercially-valued credits may be associated with one or more of: a network address, an email address, a social security number, a credit card number, a bank account number, a telephone number, a device MAC address, a username, or other unique identifier.

Those skilled in the art will further appreciate the advantages and superior features of the invention together with other important aspects thereof on reading the detailed description that follows in conjunction with the drawings.

BRIEF DESCRIPTION OF THE DRAWINGS

The components in the figures are not necessarily to scale, emphasis instead being placed upon illustrating the principles and possible configurations of the present invention. In the figures, like reference numerals designate corresponding parts throughout the different views.

DETAILED DESCRIPTION OF THE INVENTION

Figure 1:
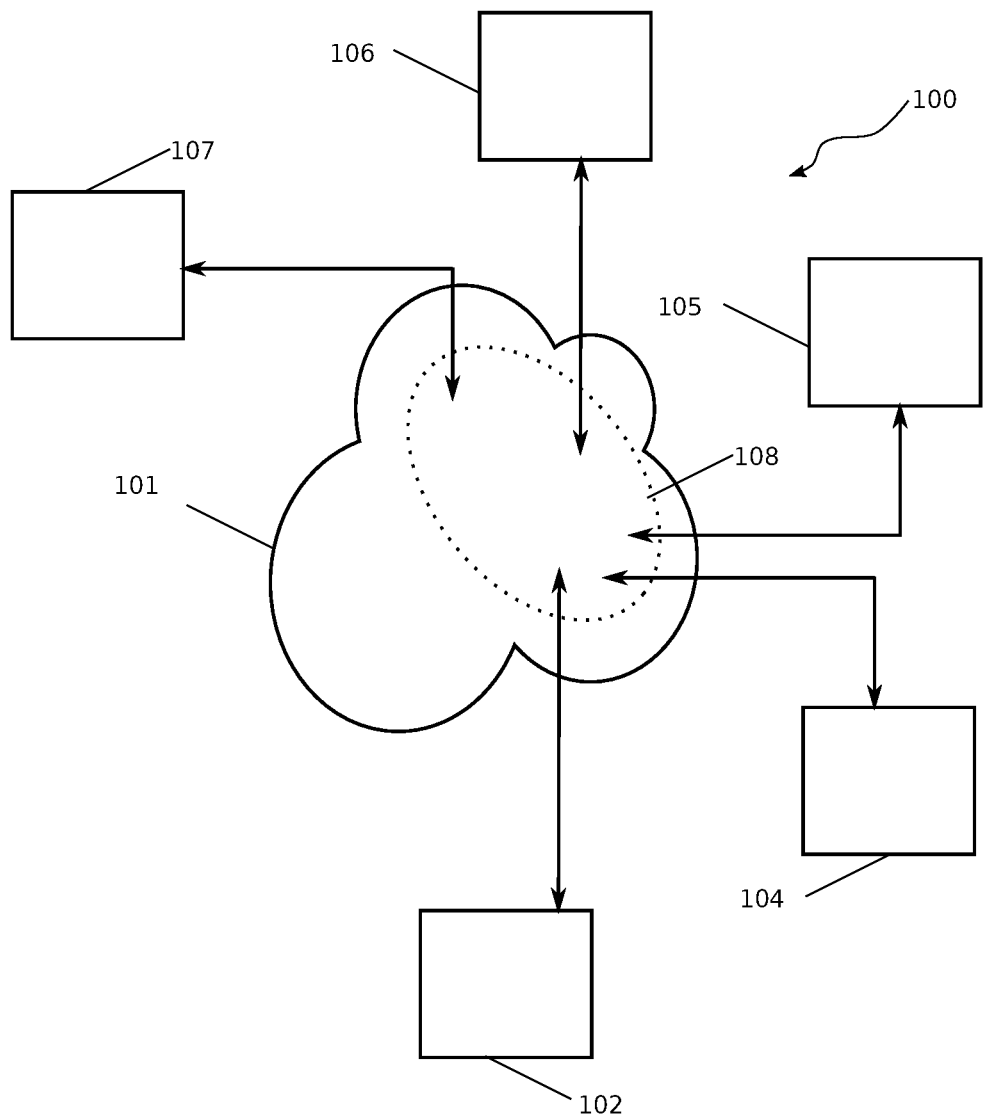
FIG. 1 illustrates a peer-to-peer network with a plurality of network connected devices connected to the peer-to-peer network, in accordance with an embodiment of the present invention.

Aspects of this disclosure will be described in the context of an exemplary system of a plurality network connected devices communicating through the medium of a peer-to-peer network system 100, as shown schematically in FIG. 1. As depicted, the peer-to-peer network 108 is embodied within a packet switched network 101, through the interconnection of the plurality of network connected devices on the peer-to-peer network 108.

A network connected device 102 may connect to the peer-to-peer network through a direct connection to the packet switched network with a wired connection, or through a wireless connection by association with a wireless access point, a cellular base station, a Bluetooth connection, or other means of connection.

Other devices connected the peer-to-peer network may include network connected devices acting as a "standard node" 104, 105 whose role is to maintain a list of other devices connected through the peer-to-peer network, and to forward on received network messages to those devices on the list, possibly independently, or possibly as a response to a request from another network connected device. As one skilled in the art will be aware, no individual standard node is required to have a complete list of all devices, as the process of peer-to-peer networking only requires that a union of a set of all standard nodes contains a complete list of all devices on the peer-to-peer network, and for every pair of network connected devices there is a network route from one device to the other, possibly via a set of one or more nodes. Therefore, the only requirement to be a participant on the peer-to-peer network is to establish a connection to one or more of the standard nodes on said network.

Further devices connected via the peer-to-peer network may include one or more network connected devices 106, 107 acting as an "enhanced node", whose role is to receive key announcement messages and other transaction messages from the peer-to-peer network, process them according to the methods and processes to be described further below, and transmitting the results of said processing back to the peer-to-peer network for inclusion in a shared ledger.

The devices described above may each be implemented through a system comprising a one or a plurality of: general purpose microprocessors, digital signal processors (DSPs), application specific instruction set processors (ASIPs), field programmable gate arrays (FPGAs), dedicated application specific integrated chips (ASICs), or other equivalent integrated or discrete logic circuitry and peripheral circuitry, connected to a tangible storage medium containing instructions which when executed effect methods and techniques described below. The techniques additionally, or alternatively, may be realized at least in part by a computer-readable communication medium or record carrier, that carries or communicates code in the form of instructions or data structures and that can be accessed, read, and/or executed by a computer.

Figure 2:
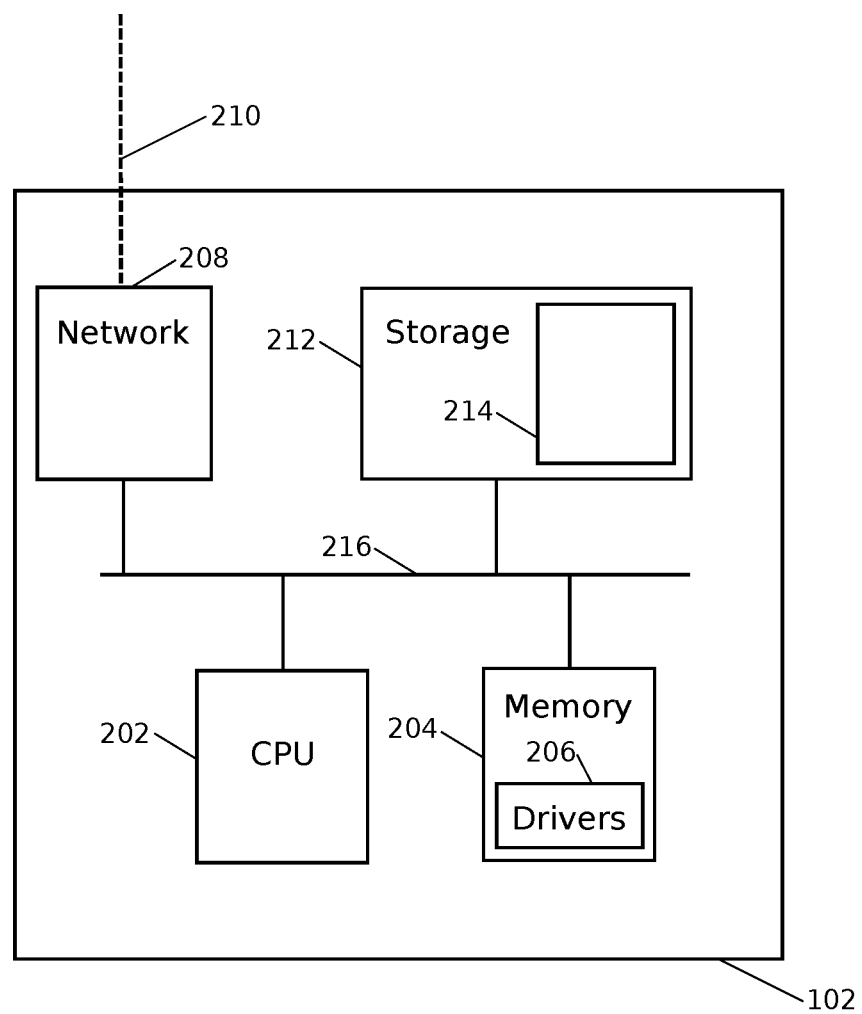
FIG. 2 illustrates a network connected device that may be utilized in the generation of a key announcement message, in accordance with an embodiment of the present invention.

An embodiment of the network connected device 102 is presented in FIG. 2, and is now discussed in further detail. The network connected device 102 may comprise a CPU 202 capable of executing instructions stored in a memory 204, and controlling other peripheral components through drivers 206 stored within the memory 204.

Further storage 212 may be present, which may contain a cryptographically secure partition or component 214, where cryptographic keys may be securely stored.

The network connected device 102 may connect to the packet switched network through a network module 208, which may consist of a direct wired connection to the packet switched network through a cable 210. In a different embodiment of the invention, the network module 208 may contain wireless components comprising one or more wireless modules implemented in firmware or hardware, including a wireless local area network (WLAN) unit such as a Wi-Fi adapter utilizing an 802.11 protocol, a wireless wide area network (WWAN) unit such as GSM, LTE, or other cellular wireless data communication system, or a Bluetooth unit. The wireless components may provide network connectivity to a packet switched network and hence to the peer-to-peer network for the network connected device.

Components comprising the network connected device may communicate through a bus 216, which may be implemented as a peripheral component interconnect express (PCIe) bus, a universal serial bus (USB), a universal asynchronous receiver/transmitter (UART) serial bus, a suitable advanced micro-controller bus architecture (AMBA) interface, a serial digital input output (SDIO) bus, or other equivalent interface.

Figure 3A:
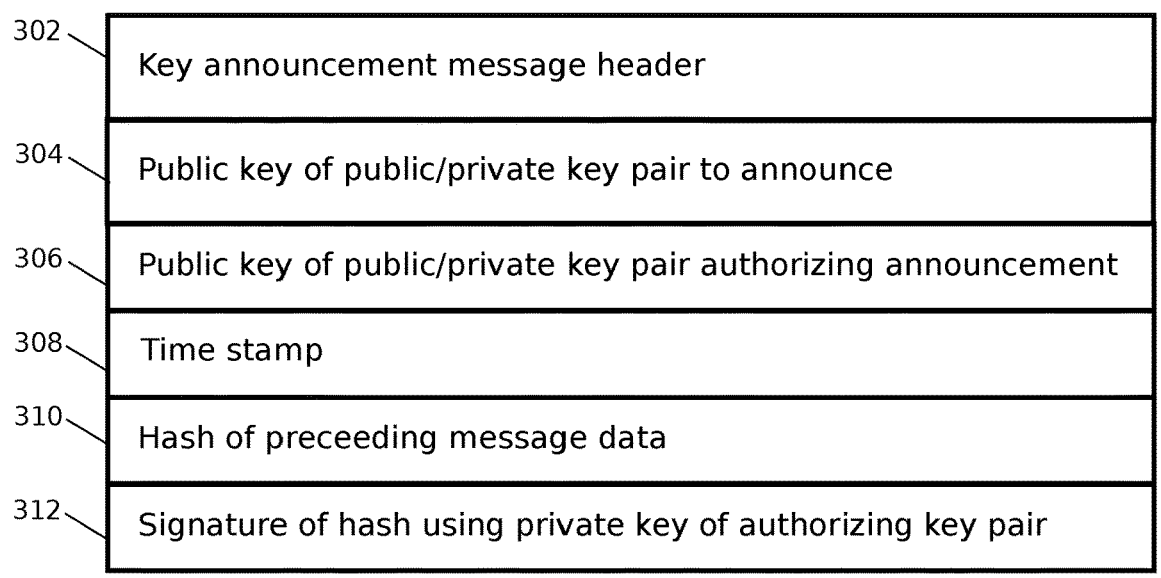
FIG. 3A is a block diagram illustrating a structure of a possible embodiment of a key announcement message, in accordance with an embodiment of the present invention.

FIG. 3A presents a possible embodiment of a key announcement message. The key announcement message header 302 may contain a marker indicating that the rest of the message contains key announcement data, and other header information such as the length of the message.

The key announcement message may contain a public key 304 of a public/private key pair to be announced.

The key announcement message may contain a public key 306 of a public/private key pair authorizing the announcement of the public/private key pair 304 referred to in previously. In an open public embodiment of the invention the keys 304 and 306 may comprise the same key. In a permission-based embodiment of the invention, the public key 306 may be a key announced previously, for example at the initialization of the public ledger.

The key announcement message may contain a time stamp 308, which in one embodiment of the invention may be used to indicate from when the key announcement is valid. Through these means it is possible to provide a public/private key pair with a future validity period, for example by specifying a time stamp in the future. In another embodiment the time stamp may be the current time, thereby authorizing the public/private key pair at the point the key announcement is sent.

The key announcement message may also comprise a hash 310 of the preceding message content. The hash may be one of a SHA, RIPEMD, Whirlpool, Scrypt, HAS-160, BLAKE, or other cryptographic hash function applied to all or part of the preceding content of the message, where a hash output cannot be determined from hash input other than by the application of the cryptographic hash function to the hash input.

The key announcement message may also comprise a digital signature 312, generated with the private key associated with the authorizing public key 306 and the hash 310, in order to provide for the veracity of the key announcement message. The digital signature algorithm used may be one of ECDSA, DSA, RSA, or some other secure asymmetric key digital signing algorithm.

Figure 3B:
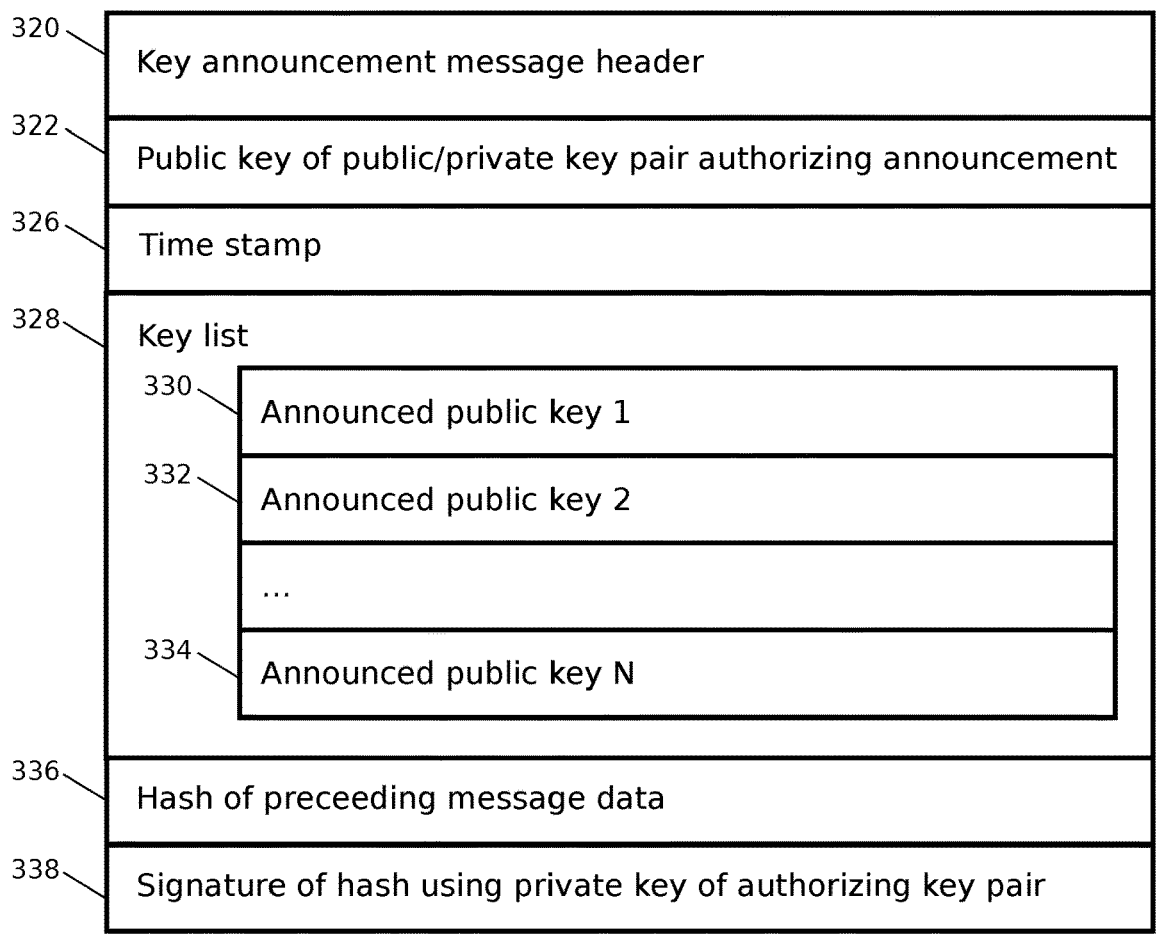
FIG. 3B is a block diagram illustrating a second structure of a possible multiple key announcement message, according to a second embodiment of the invention.

FIG. 3B presents a possible embodiment of a multiple key announcement message. The multiple key announcement message header 320 may contain a marker indicating that the rest of the message contains multiple key announcement data, and other header information such as the length of the message.

The multiple key announcement message may contain a public key 322 of a public/private key pair authorizing the use of a plurality of public/private keys on the shared ledger.

The multiple key announcement message may contain a time stamp 326, which in one embodiment of the invention may be used to indicate from what point in time the multiple key announcement message is valid. Through these means it is possible to provide an announcement message with a validity period that starts in the future. In another embodiment the time stamp may be the current time, thereby immediately validating the multiple key announcement message at the point the message is sent.

The multiple key announcement message may contain a key list 328. Within the list there may be listed any number of public keys (330, 332, up to 334 in this example) of the plurality of public/private key pairs, for which an announcement is made to allow participation on the shared ledger. By these means, the holder of an announced key pair for which a public key is listed may sign future transactions and messages for inclusion on the distributed ledger using a private key associated with the announced public key.

The multiple key announcement message may also comprise a hash 336 of the preceding message content. The hash may be one of a SHA, RIPEMD, Whirlpool, Scrypt, HAS-160, BLAKE, or other cryptographic hash function applied to all or part of the preceding content of the message, where a hash output cannot be determined from hash input other than by the application of the cryptographic hash function to the hash input.

The multiple key announcement message may also comprise a digital signature 338, generated with a private key associated with the authorizing public key 322 and the hash 336, in order to provide for the veracity of the authorization of the multiple key announcement message. The digital signature algorithm used may be one of ECDSA, DSA, RSA, or some other secure asymmetric key digital signing algorithm.

Figure 4:
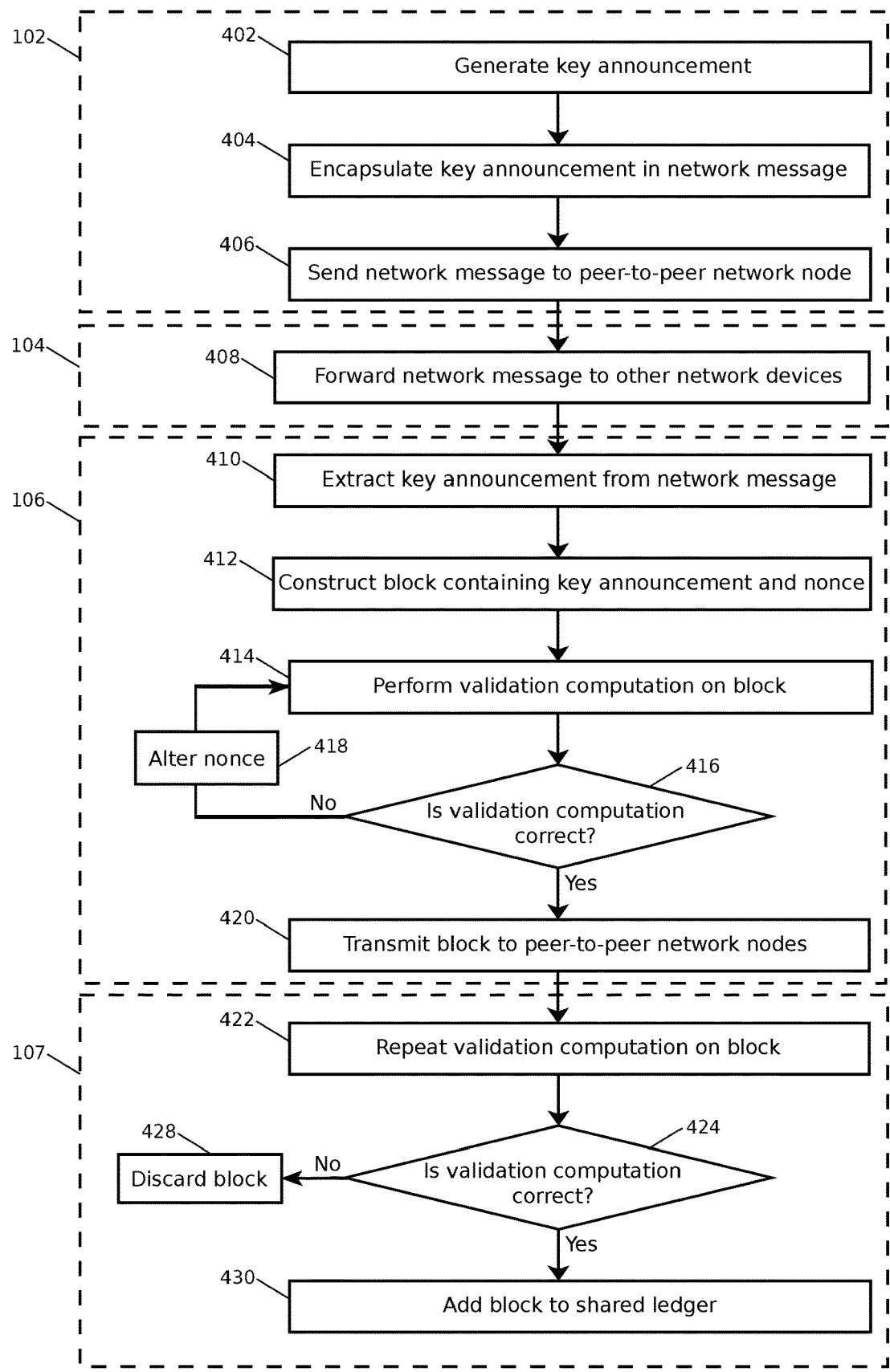
FIG. 4 is a signal flow diagram providing a general overview of a method and apparatus controlling the flow of the key announcement message data from the first of the plurality network connected device to the remainder of the plurality of network connected devices connected via the peer-to-peer network for eventual inclusion in a shared ledger.

A high level flow diagram illustrating one possible embodiment of the system and the steps taken therein is presented in FIG. 4. Note that although the specific embodiment and example provided by FIG. 4 is for the generation and inclusion of a key announcement message in the shared ledger, the same flow diagram and associated methods and processes apply to the generation and inclusion of a multiple key announcement message. From here on "a key announcement message" can be equally read as "a multiple key announcement message".

The interaction of the network connected device 102 with the plurality of network connected devices, and specifically a network connected device functioning as a standard node 104, and a network connected device functioning as an enhanced node 106, and finally another one of the plurality of network connected devices 107, is shown. The flow of a data comprising the generation of the key announcement message, inclusion in a successfully generated block of data, and the appending of said block of data to the shared ledger is also illustrated through FIG. 4.

Once the network connected device 102 has determined the need to announce a key pair, it may generate a key announcement message 402. The key announcement message may then be encapsulated in a network message 404 and sent on to the peer-to-peer network 406.

Once the key announcement message encapsulated in the network message has been received by a network connected device acting as a standard node 104, the node may forward the message to other network connected devices on the peer-to-peer network 408. Other network connected devices may also make requests to the standard node for network messages that they have not yet received. Through these means, the key announcement message encapsulated in the network message is forwarded to all interested parties on the peer-to-peer network.

Through these network interactions, the key announcement message encapsulated in the network message may arrive at a network connected device acting as an enhanced node 106. The enhanced node may then extract the key announcement message from the network message as per step 410. After the key announcement message has been obtained, the enhanced node may construct a block of data containing the key announcement message, a nonce, and any other messages that the enhanced node has previously received and that have not yet been included in the shared ledger, as noted in step 412. The block of data may also contain other messages and elements, which will be detailed further below. The enhanced node may then perform a validation computation on the block of data 414, further details of which will be provided below. For now, it suffices to note that the validation computation may either return a correct result, or a failure as per step 416. If the validation computation returns a failure, the enhanced node may alter the nonce as per step 418, for example if it is an integer by incrementing or decrementing the value of the number by a chosen amount, or by choosing a new random value, and may then repeat the validation computation on the new block as per step 414. If the validation computation is correct, the block of data has been successfully verified and the enhanced node may transmit it to the peer-to-peer network 420.

Through transmission to the peer-to-peer network, the block of data may arrive at another network connected device 107, which may constitute another enhanced node, or another standard node. The network connected device 107 may then repeat the same validation computation on the block 422 as previously performed by the enhanced node 106 in step 414, and the validation computation may return either a successful result or a failure 424. If the computation result is a failure, the network connected device 107 may discard the block, as shown in step 428. If the validation computation produces a successful result, then the network connected device 107 may add the block of data to a copy of the shared ledger 430.

Figure 5:
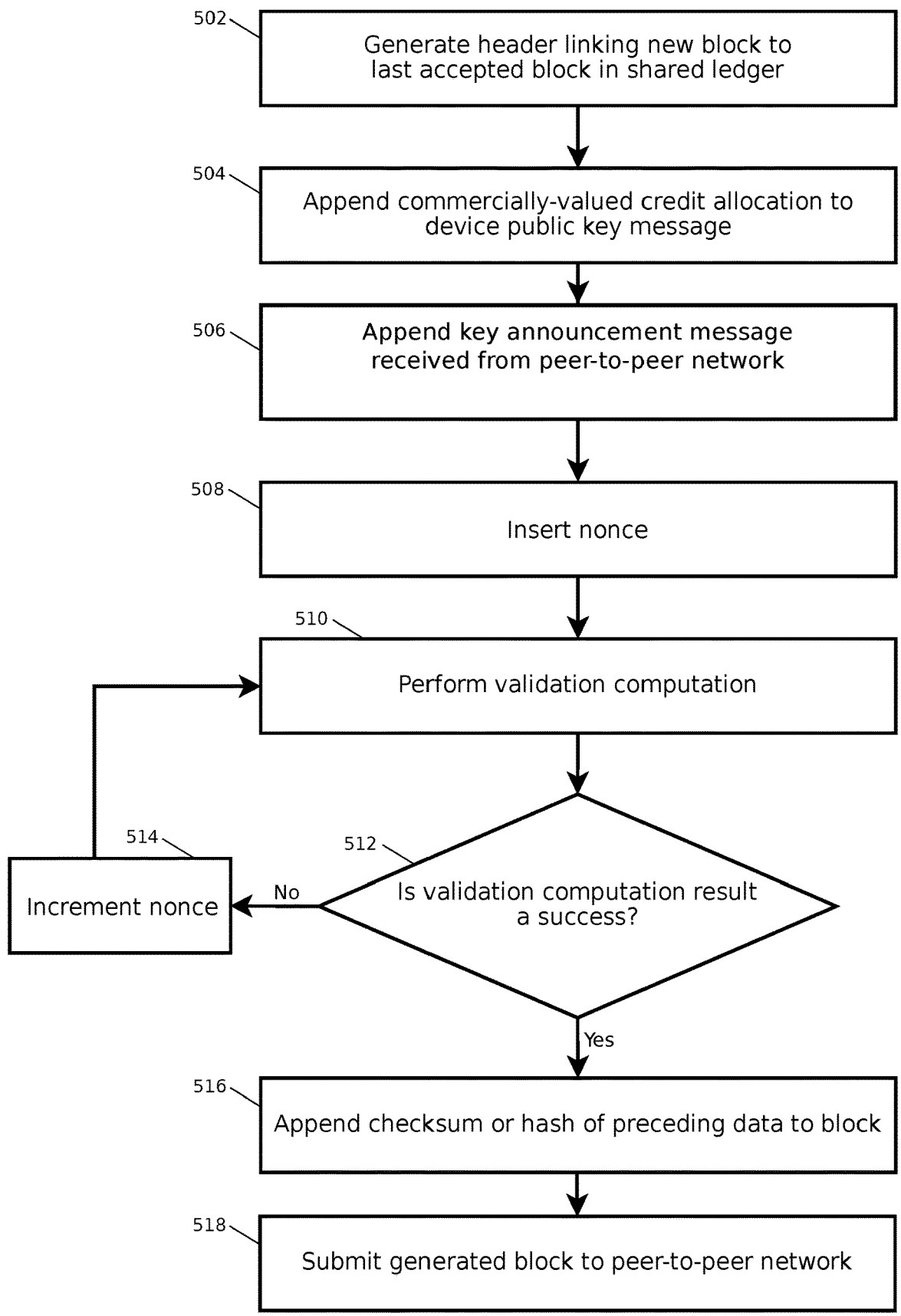
FIG. 5 is a flowchart illustrating a method for generating a valid block of data containing a key announcement message and a commercially-valued credit allocation for inclusion in the shared ledger, according to an embodiment of the invention.

FIG. 5 presents a flowchart providing further details for one possible embodiment of an enhanced node, and provides a specification for the steps that may be taken once a key announcement message has been received by a network connected device acting as an enhanced node.

In step 502 the enhanced node generates a header for a new block of data, which in one embodiment may contain data indicating the start of the new block of data, and may contain a link back to a last accepted block of data in the shared ledger, for example through inclusion of a hash of the last accepted block of data. The header may also contain a time stamp.

In step 504 the enhanced node may append a message to the new block of data, commonly known to those skilled in the art as a "block reward", which allocates a number of commercially-valued credits to a public key associated with a network connected device. In other embodiments the number of commercially-valued credits may be associated with one or more of: a network address, a different cryptographic key, an email address, a telephone number, a username, or a MAC address.

In step 506 the enhanced node may append none, one, or a plurality of key announcement messages, or other data, transactions or messages, received through the peer-to-peer network, to the new block of data. The enhanced node may also append a count of the number of messages or the size of the data added to the block of data.

In step 508 the enhanced node may insert a nonce into the new block of data. The nonce may comprise a number, a string, or a binary data, and may be selected randomly or according to a predetermined algorithm. For example, the nonce may initially be a number 1, and subsequently incremented by one for each repetition until a successful result is returned from a validation computation.

In step 510 the enhanced node may conduct the validation computation on the new block of data in its current state. The validation computation may comprise applying a one or more hash functions to the new block of data, and then possibly applying the one or more hash functions or a different one or more hash functions repeatedly one or more times to the output of the previous hash function applied. The hash functions used may include SHA, RIPEMD, Whirlpool, Scrypt, HAS-160, BLAKE, or other cryptographic hash function where a hash output cannot be determined from a hash input other than by the application of the cryptographic hash function to the hash input. A final result of step 510 may be a number.

In another embodiment, in step 510 the enhanced node may conduct a validation computation on the new block of data based on a random or pseudo-random selection of a one other enhanced node, based on the one other enhanced node's previous history of participating on the peer-to-peer network. The one other enhanced node may sign the new block of data proposed using a private key, with a final result of the validation computation of step 510 which may be a number.

In step 512 the final result may be compared to a target value. The target value may be a fixed value agreed upon by a plurality of participating devices in the peer-to-peer network, or it may be a dynamic value determined in one embodiment by an average time taken for enhanced nodes in the peer-to-peer network to produce a last K blocks of data, where K is a fixed value agreed upon by the plurality of participating devices in the peer-to-peer network. When the final result of the validation computation is compared to the target value, the result may be determined to be successful if the final result is greater than the target. In other embodiments of the invention the final result may be determined to be successful if the final result is greater or equal to the target value, or less than the target value, or less than or equal to the target value, or by some other Boolean operation on the final result and the target value.

If the result of step 512 is "no", then step 514 may be executed. The enhanced node may alter the nonce in the block, for example by incrementing its value if it is a number, or by selecting a new nonce or a new one other enhanced node at random, and may then proceed to step 510 again. The repeated cycle of step 510, step 512, and step 514 is often described in the art as a "proof of work" effort or a "proof of stake" effort.

If the result of step 512 is "yes", then step 516 may be executed. The enhanced node may append a checksum or cryptographic hash to the new block of data, which allows third parties to verify that the new block of data is correct and has not been altered or corrupted during data transfer.

Finally, the enhanced node may execute step 518, by sending the new block of data that has been completed to the peer-to-peer network for inspection by other network connected devices, and subsequent inclusion in the shared ledger.

Figure 6:
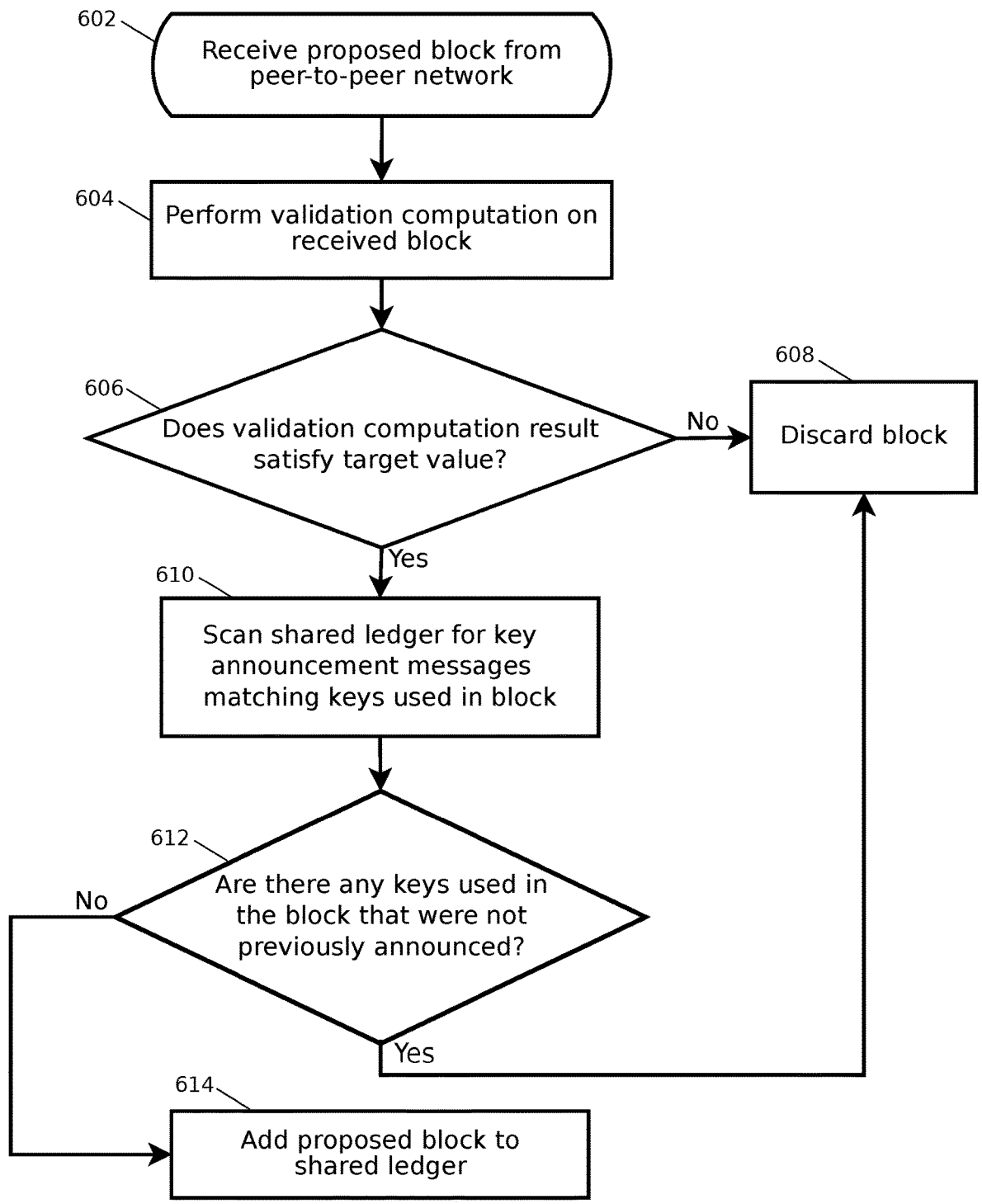
FIG. 6 is is a flowchart illustrating a method for processing a block and determining whether it may or may not be included in the shared ledger, based on whether the block contains a one or more keys that have not previously been announced in a key announcement message, according to one embodiment of the invention.

A method for verifying a submitted block of data that may contain a message signed by a key announced by a previous key announcement message, submitted to the peer-to-peer network by an enhanced node, by one possible embodiment of a network connected device henceforth referred to as a verifier, is presented in FIG. 6. In step 602 the verifier may receive the submitted block of data from the peer-to-peer network.

In step 604 the verifier may perform a same validation computation on the submitted block of data, as performed by the enhanced node.

In step 606 the verifier may examine a result to determine if the submitted block of data satisfies the validation computation. If the result is "no", the verifier may proceed to step 608, in which the submitted block of data is discarded. If the result is "yes", the verifier may proceed to step 610.

In step 610 the verifier may scan the shared ledger to determine if any of a plurality keys used in the submitted block of data for signing messages have previously been announced by a key announcement message stored in the shared ledger. In another embodiment the verifier may previously have scanned the shared ledger and constructed a list of announced keys, which may be used to determine if any of the plurality of keys used in the submitted block of data for signing message have not previously been announced.

The result from step 610 may be evaluated by the verifier in step 612. If the result of step 612 is "yes", then a one or more keys not previously announced may have been found to have been used in signing messages in the submitted block of data, and the verifier may proceed to step 608, in which the submitted block of data is discarded. If the result of step 612 is "no", then no one or more keys not previously announced were found, and the verifier may proceed to step 614, in which the submitted block of data is added to the shared ledger.

As will be appreciated from the above discussion, an advantage of the systems and methods of this disclosure includes the announcement of public keys used within a distributed peer-to-peer shared ledger, a file, or a database. The techniques also allow for rewarding of owners of network connected devices participating in the process of announcing keys and charging of owners or users of network connected devices requesting the announcement of keys used in the peer-to-peer network system.

What is claimed is:

1. A method for a self-signed announcement of a public/private key pair used in a public open shared ledger distributed through a peer-to-peer network comprising the following steps:
   (A) generating a key announcement message for the public/private key pair;
   (B) signing all or part of the key announcement message with a private key of the public/private key pair;
   (C) transmitting the key announcement message to the peer-to-peer network;
   (D) appending the key announcement message, by the peer-to-peer network, to the public open shared ledger; and
   (E) rejecting, by the peer-to-peer network, any request to append to the public open shared ledger a further message signed by the private key of the public/private key pair prior to publication of the key announcement message.

2. The method of claim 1, further comprising:
   creating a record of a number of commercially-valued credits associated with the public key of the second public/private key pair; and
   including the record of the number of commercially-valued credits in the public open shared ledger with the key announcement message, by the peer-to-peer network.

3. The method of claim 2, wherein the commercially-valued credits are associated with one or more of: a network address, a cryptographic key, or an email address.

4. The method of claim 1, wherein the key announcement message further comprises a plurality of public keys of a corresponding plurality of public/private key pairs, and wherein all or part of the key announcement message is signed by a plurality of private keys corresponding to the corresponding plurality of public/private key pairs.

5. A plurality of network connected devices, each comprising: one or more processors and storage media comprising computer instructions, said plurality of network connected devices being connected via a peer-to-peer network to each other and instantiating a public open shared ledger, arranged such that, when the computer instructions are executed on the one or more processors of one or more of the plurality of network connected devices, operations are caused comprising the following steps:
- (A) generating, by a first of the plurality of network connected devices, a key announcement message for a public/private key pair;
- (B) signing, by the first of the plurality of network connected devices, all or part of the key announcement message with a private key of the public/private key pair;
- (C) transmitting, by the first of the plurality of network connected devices, the key announcement message to a remainder of the plurality of network connected devices;
- (D) appending the key announcement message, by the plurality of network connected devices, to the public open shared ledger; and
- (E) rejecting, by the plurality of network connected devices, any request to append to the public open shared ledger a further message signed by the private key of the public/private key pair prior to publication of the key announcement message.

6. The plurality of network connected devices of claim 5, further comprising:
creating, by a first of the plurality of network connected devices, a record of a number of commercially-valued credits associated with the public key of the public/private key pair; and
including the record of the number of commercially-valued credits in the public open shared ledger with the key announcement message, by the plurality of network connected devices.

7. The plurality of network connected devices of claim 6, wherein the commercially-valued credits are associated with one or more of: a network address, a cryptographic key, or an email address.

8. The plurality of network connected devices of claim 5, wherein the key announcement message further comprises a plurality of public keys of a corresponding plurality of public/private key pairs, and wherein all or part of the key announcement message is signed by a plurality of private keys corresponding to the corresponding plurality of public/private key pairs.

* * * * *